United States Patent
Cho et al.

(10) Patent No.: US 10,530,737 B2
(45) Date of Patent: Jan. 7, 2020

(54) ELECTRONIC DEVICE AND OPERATION METHOD THEREOF

(71) Applicant: SAMSUNG ELECTRONICS CO., LTD., Suwon-si, Gyeonggi-do (KR)

(72) Inventors: Bong-chan Cho, Suwon-si (KR); Young-eun Kim, Suwon-si (KR); In-ji Kim, Seoul (KR); Ji-soo Kim, Goyang-si (KR); Ji-yeon Park, Suwon-si (KR); Woo-seok Hwang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 187 days.

(21) Appl. No.: 15/460,496

(22) Filed: Mar. 16, 2017

(65) Prior Publication Data
US 2017/0272398 A1    Sep. 21, 2017

(30) Foreign Application Priority Data

Mar. 16, 2016 (KR) .................. 10-2016-0031465

(51) Int. Cl.
*H04L 29/12* (2006.01)
*H04N 21/41* (2011.01)
(Continued)

(52) U.S. Cl.
CPC ....... *H04L 61/103* (2013.01); *H04N 21/4126* (2013.01); *H04N 21/42224* (2013.01);
(Continued)

(58) Field of Classification Search
CPC ... H04L 61/103; H04L 67/36; H04L 61/6022; H04L 29/06; H04L 63/101; H04L 63/1408; H04L 63/20; H04L 41/0213; H04L 41/046; H04L 41/12; H04L 63/08; H04L 63/0876; H04L 9/32; H04L 43/0811; H04L 63/18; H04W 76/10; H04W 84/12; H04W 88/08; H04W 12/06; H04W 4/00; H04W 76/02; H04W 4/80; H04W 4/02; H04W 4/023; H04W 8/005; H04W 12/04; H04W 48/16;
(Continued)

(56) References Cited

U.S. PATENT DOCUMENTS

2009/0210935 A1*  8/2009  Miley ............... H04W 12/1206
                                                    726/7
2013/0169418 A1    7/2013  Seo et al.
(Continued)

FOREIGN PATENT DOCUMENTS

KR    10-2013-0078329    7/2013
KR    10-2013-0097303    9/2013

*Primary Examiner* — Hardikkumar D Patel
(74) *Attorney, Agent, or Firm* — Nixon & Vanderhye P.C.

(57) ABSTRACT

A method of operating an electronic device includes: determining whether an external electronic device is connected to an access point to which the electronic device is connected; transmitting state information of the electronic device to the external electronic device connected to the access point; receiving an input corresponding to the transmitted state information of the electronic device, from the external electronic device; displaying a result corresponding to the received input on a display; and transmitting the result displayed on the display to the external electronic device.

18 Claims, 9 Drawing Sheets

(51) Int. Cl.
*H04N 21/422* (2011.01)
*H04N 21/472* (2011.01)
*H04W 88/08* (2009.01)
*H04W 84/12* (2009.01)

(52) U.S. Cl.
CPC ....... *H04N 21/472* (2013.01); *H04L 61/6022* (2013.01); *H04W 84/12* (2013.01); *H04W 88/08* (2013.01)

(58) Field of Classification Search
CPC .. H04W 12/12; H04W 88/02; H04N 21/4126; H04N 21/42224; H04N 21/43615; H04N 21/472; H04N 21/8166; H04N 21/4516; H04N 21/4183; H04N 21/4184; H04N 21/4312; H04N 21/4586; H04N 2005/44517; H04N 21/485; H04N 9/80; H04N 5/765; H04N 9/82; H04N 9/8205; H04N 21/4302; H04N 21/4408; H04N 21/4131; G06F 21/16; G06F 21/84; G06F 21/64; G06F 2221/2147; G06F 8/65; G06F 15/177; G06F 3/048; G06F 11/30; G06F 15/173; G06Q 10/101; Y02D 70/1262; Y02D 70/164; H04M 3/42; H04M 3/42042; H04M 1/575; H04M 1/7253; G09G 5/003; G09G 2370/04; G11B 27/11

See application file for complete search history.

(56) References Cited

U.S. PATENT DOCUMENTS

| | | | |
|---|---|---|---|
| 2013/0174042 A1* | 7/2013 | Kim | G06F 3/048 715/735 |
| 2014/0178034 A1* | 6/2014 | Kim | H04N 5/765 386/230 |
| 2014/0181886 A1* | 6/2014 | Goodman | H04M 3/42042 725/133 |

* cited by examiner

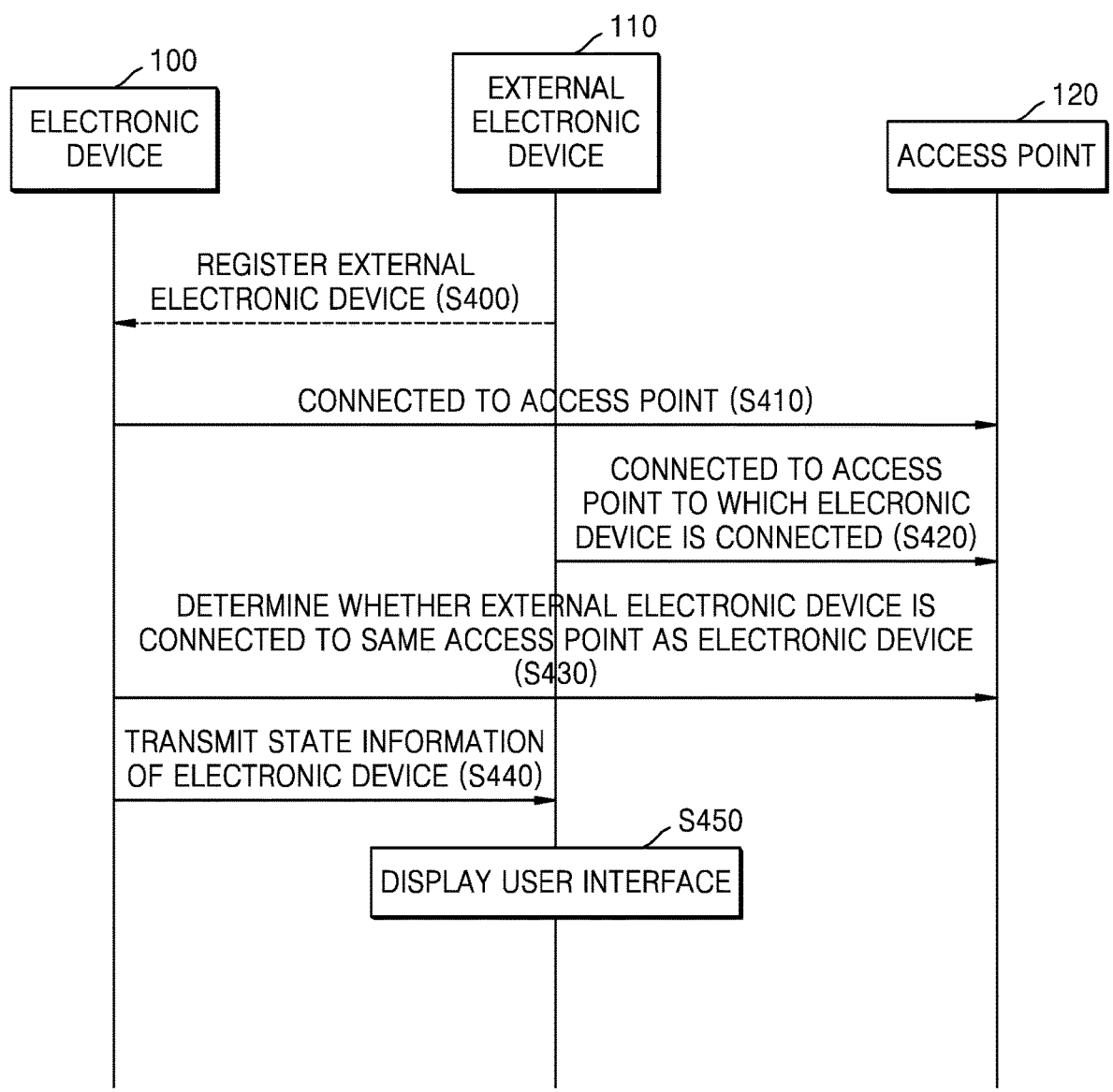

ELECTRONIC DEVICE AND OPERATION METHOD THEREOF

CROSS-REFERENCE TO RELATED APPLICATION

This application is based on and claims priority under 35 U.S.C. § 119 to Korean Patent Application No. 10-2016-0031465, filed on Mar. 16, 2016, in the Korean Intellectual Property Office, the disclosure of which is incorporated by reference herein in its entirety.

BACKGROUND

The present disclosure relates generally to an electronic device and an operation method thereof, and for example, to an electronic device configured to use an external electronic device and an operation method thereof.

With the development of networks and multimedia technologies, various convergence services using a network established among electronic devices have appeared.

The network established among electronic devices may be easily obtained via a WiFi network that is commonly used by the electronic devices.

SUMMARY

The present disclosure provides an electronic device which is connected to an access point of a WiFi network and uses an external electronic device sharing the WiFi network, and an operation method of the electronic device.

According to an example aspect of the present disclosure, an electronic device is provided, including: a display; a communicator comprising communication circuitry; and a controller configured to determine whether an external electronic device is connected to an access point to which the electronic device is connected, and to control the communicator to transmit state information of the electronic device to the external electronic device connected to the access point, wherein the controller is configured to receive, from the external electronic device, an input corresponding to the transmitted state information of the electronic device, to control the display to display a result corresponding to the received input, and to control the communicator to transmit the displayed result to the external electronic device.

The electronic device may further include a storage unit configured to store information of the external electronic device, wherein the controller is configured to control the communicator to scan external electronic devices connected to the access point to which the electronic device is connected, and to transmit the state information of the electronic device to an external electronic device from among the scanned external electronic devices, the external electronic device being pre-registered in the storage unit.

The controller may be configured to identify the pre-registered external electronic device by scanning MAC addresses of the external electronic devices connected to the access point using an address resolution protocol and comparing the scanned MAC addresses of the external electronic devices with a MAC address registered in the storage unit.

The controller may be configured to determine whether the external electronic device is connected to the access point, regardless of a power state of the electronic device.

The state information of the electronic device may include at least one of information indicating a power state of the electronic device, and a type of content reproduced in the electronic device.

The electronic device may be automatically connected to the access point when the electronic device is within a pre-determined distance from the access point, in which communication between the electronic device and the access point is possible, and the controller may be configured to control the communicator to transmit information about the connection of the electronic device, to the external electronic device connected to the access point.

The controller may be configured to control the communicator to transmit information to the external electronic device, which is necessary for the external electronic device to display a user interface to identify the electronic device.

According to another example aspect of the present disclosure, a portable electronic device is provided, including: a communicator comprising communication circuitry; a display; and a controller configured to be connected to an access point to which an electronic device is connected, to receive state information of the electronic device from the electronic device, based on the connection, to control the display to display a user interface including the received state information of the electronic device, to receive an input via the user interface, and to control the communicator to transmit the received input to the electronic device.

The state information of the electronic device may include at least one of information indicating a power state of the electronic device, and a type of content reproduced in the electronic device.

The portable electronic device may be automatically connected to the access point when the portable electronic device is within a pre-determined distance from the access point, in which communication between the portable electronic device and the access point is possible, and the controller may be configured to receive a program for displaying the user interface, from at least one of the electronic device and a server, by using information for displaying the user interface, the information being received from the electronic device.

According to another example aspect of the present disclosure, method of operating an electronic device is provided, the method including: determining whether an external electronic device is connected to an access point to which the electronic device is connected; transmitting state information of the electronic device to the external electronic device connected to the access point; receiving an input corresponding to the transmitted state information of the electronic device, from the external electronic device; displaying a result corresponding to the received input on a display; and transmitting the result displayed on the display to the external electronic device.

The determining whether an external electronic device is connected to an access point to which the electronic device is connected may include determining whether the external electronic device is connected to the access point regardless of a power state of the electronic device.

The state information of the electronic device may include at least one of information indicating a power state of the electronic device, and a type of content reproduced in the electronic device.

The electronic device may be automatically connected to the access point when the electronic device is within a pre-determined distance from the access point, in which communication between the electronic device and the access point is possible, and the operation method may further include transmitting information about the connection of the electronic device to the external electronic device connected to the access point.

The operation method may further include transmitting information to the external electronic device, which is necessary for the external electronic device to display a user interface to identify the electronic device.

According to another example aspect of the present disclosure, method of operating a portable electronic device is provided, the method including: connecting to an access point to which an electronic device is connected; receiving state information of the electronic device from the electronic device based on the connection; displaying a user interface including the received state information of the electronic device on a display of the portable electronic device; receiving an input via the user interface; and transmitting the received user input to the electronic device.

The state information of the electronic device may include at least one of information indicating a power state of the electronic device, and a type of content reproduced in the electronic device.

The portable electronic device may be automatically connected to the access point when the portable electronic device is within a pre-determined distance from the access point, in which communication between the portable electronic device and the access point is possible, and the operation method may further include receiving a program for displaying the user interface, from at least one of the electronic device and a server, by using information for displaying the user interface, the information being received from the electronic device.

According to another example aspect of the present disclosure, a non-transitory computer-readable recording medium is provided having embodied thereon a computer program for executing the method according to various example aspects of the present disclosure.

BRIEF DESCRIPTION OF THE DRAWINGS

The above aspects, features and attendant advantages of the present disclosure will be more readily understood and appreciated from the following detailed description, taken in conjunction with the accompanying drawings, in which like reference numerals refer to like elements, and wherein:

FIG. 4 is a flowchart illustrating example operations among an electronic device, an external electronic device, and an access point, according to an example embodiment of the present disclosure;

DETAILED DESCRIPTION

Most of the terms used herein are general terms that have been widely used in the technical art to which the present disclosure pertains. However, some of the terms used herein may be created reflecting intentions of technicians in this art, precedents, or new technologies. Accordingly, the specific terms used herein should be understood based on the meanings thereof and the whole context of the present disclosure.

In this specification, the phrase "in some embodiments" or "according to an embodiment" does not necessarily refer to the same embodiment.

The present disclosure may be described in terms of functional block components and various processing steps. Such functional blocks may be realized by any number of hardware and/or software components configured to perform the specified functions. For example, the functional blocks of the present disclosure may be realized by one or more microprocessors or circuit components for predetermined functions. Also, for example, the functional blocks of the present disclosure may be realized by various programming or scripting languages. The functional blocks may be realized by an algorithm executed by one or more processors. Furthermore, the present disclosure could employ any number of conventional techniques for electronics configuration, signal processing and/or control, data processing and the like. The words "mechanism," "element," "unit," and "component" are used broadly and are not limited to mechanical or physical embodiments.

Figure 1:
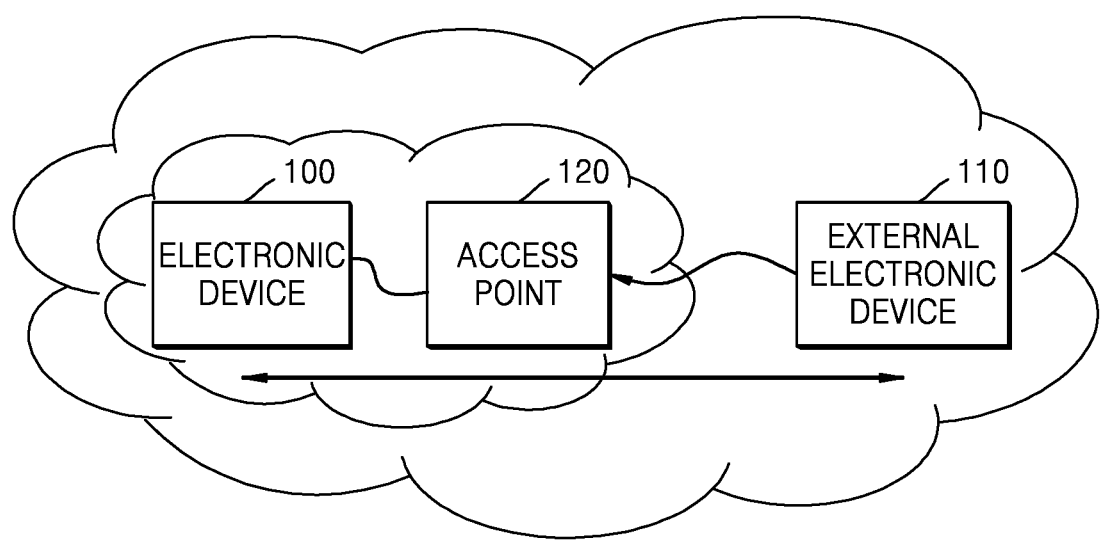
FIG. 1 is a diagram illustrating an example of an electronic device and an external electronic device connected via a WiFi network, according to an example embodiment of the present disclosure.

FIG. 1 is a diagram illustrating an example electronic device 100 and an external electronic device 110 connected via a wireless fidelity (WiFi) network, according to an example embodiment of the present disclosure.

Referring to FIG. 1, the electronic device 100 may be a television (TV). However, it is only an embodiment, and the electronic device 100 may include electronic devices including a display. For example, the electronic device 100 may include various electronic devices, such as cellular phones, tablet personal computers (PCs), digital cameras, camcorders, laptop computers, desktop computers, electronic book terminals, digital broadcasting terminals, personal digital assistants (PDAs), portable multimedia players (PMP), navigation devices, MPEG audio layer 3 (MP3) players, and wearable devices, or the like, but is not limited thereto. In particular, embodiments of the present disclosure may be conveniently realized by display devices having a large display, such as TVs. However, the embodiments are not limited thereto. The electronic device 100 may be a stationary or a mobile device, and may be a digital broadcasting receiver which is capable of receiving digital broadcasting.

The electronic device 100 may communicate via a WiFi network, and may use peer to peer (P2P) communication, such as WiFi direct, Bluetooth, or ZigBee.

The external electronic device 110 may include various types of devices configured to control the electronic device 100, such as cellular phones, tablet PCs, wearable devices, or remote controllers, or the like, but is not limited thereto.

The external electronic device 110 may communicate via a WiFi network, and may use P2P communication, such as WiFi direct, Bluetooth, or ZigBee.

The external electronic device 110 may control the electronic device 100 by using short-range communication, such as infrared or Bluetooth. The external electronic device 110 may control functions of the electronic device 100 by using at least one of a key (including a button), a touchpad, a microphone (not shown) which is capable of receiving a voice of a user, and a sensor (not shown) which is capable of recognizing motion of the external electronic device 110, which are provided in the external electronic device 110.

The external electronic device 110 may include a power on/off button to turn on or turn off the electronic device 100. The external electronic device 110 may perform channel change, volume adjustment, ground wave broadcasting/cable broadcasting/satellite broadcasting selection, or environment setting with respect to the electronic device 100, based on a user input.

The electronic device 100 may be controlled by an input (e.g., a user input) that moves the external electronic device 110 in an up, down, right, or left direction or inclines the external electronic device 110 in a certain direction. Information about the motion of the external electronic device 110, sensed via a sensor of the external electronic device 110, may be transmitted to the electronic device 100.

The electronic device 100 may calculate (determine) a pointing position coordinate on a display of the electronic device 100 from the information about the motion of the external electronic device 110 and move the pointing position of the electronic device 100 to correspond to the calculated coordinate. Accordingly, the pointing position on the display of the electronic device 100 may be changed or various displayed menus may be activated. Alternatively, when the external electronic device 110 includes a touch pad, the pointing position on the display of the electronic device 100 may be changed or various displayed menus may be selectively activated, according to a displacement value of an object, such as a finger of a user, etc., which moves on the touch pad.

In the present disclosure, the term "user" may denote a person controlling a function or an operation of the electronic device 100 or the external electronic device 110, and may include a viewer, a manager, or an installation engineer.

The electronic device 100 according to an embodiment may determine whether the external electronic device 110 is connected to an access point (AP) 120, to which the electronic device 100 is connected. Also, the electronic device 100 may transmit state information of the electronic device 100 to the external electronic device 110 connected to the AP 120.

The electronic device 100 may be connected to the AP 120 in a WiFi network environment. The electronic device 100 may store connection information with respect to the AP 120 in the electronic device 100. The connection information with respect to the AP 120 may include various pieces of information that are necessary for connection with the AP 120 in the WiFi network environment. For example, the connection information may include subsystem identification (SSID) of the AP 120 and a password for connection with the AP 120. However, the connection information is not limited thereto. Also, according to an embodiment, the electronic device 100 may be automatically connected to the AP 120 when the electronic device 100 is within a predetermined distance in which the electronic device 100 may communicate with the AP 120.

The external electronic device 110 may be registered in the electronic device 100, and the electronic device 100 may store information of the external electronic device 110 to register the external electronic device 110. In detail, the information of the external electronic device 110 may include a media access control (MAC) address of the external electronic device 110, a name of the external electronic device 110, a name of a user, connection information with respect to the AP 120, etc. However, the information of the external electronic device 110 is not limited thereto, and information identifying the external electronic device 110, such as user information or a name of the device, may be pre-set in the electronic device 100. The electronic device 100, via this process of registering the external electronic device 110, may determine whether the external electronic device 110 registered in the electronic device 100 is connected to the AP 120 to which the electronic device 100 is connected, and may transmit state information of the electronic device 100 to the external electronic device 110 connected to the AP 120.

To determine whether the external electronic device 110 is connected to the AP 120 to which the electronic device 100 is connected may denote to scan external electronic devices 110 connected to the AP 120 to which the electronic device 100 is connected. According to an embodiment, the electronic device 100 may scan MAC addresses of the external electronic devices 110 connected to the AP 120 by using an address resolution protocol (ARP), and compare the scanned MAC addresses of the external electronic devices 110 with a pre-registered MAC address to identify whether a registered external electronic device 110 is connected to the AP 120. The determining whether the external electronic device 110 is connected to the AP 120 to which the electronic device 100 is connected may be performed when the electronic device 100 is in a power-off state or in a standby mode. For example, only some components of the electronic device 100, including a communicator (e.g., including communication circuitry), which is necessary to scan the external electronic devices 110 connected to the AP 120, may remain in a power-on state, and other components of the electronic device 100 may be in a power-off state. Thus, a user who wishes to control the electronic device 100 via the external electronic device 110 may identify and control a state of the electronic device 100 only by being connected to the AP 120 to which the electronic device 100 is connected, without manually pairing the external electronic device 110 to the electronic device 100.

Also, the electronic device 100 may transmit the state information of the electronic device 100 to the external electronic device 110 connected to the AP 120. To transmit the state information of the electronic device 100 to the external electronic device 110 connected to the AP 120, via the electronic device 100, may denote to transmit the state information of the electronic device 100 to the registered external electronic device 110 from among the scanned external electronic devices 110.

The state information of the electronic device 100 may denote information indicating an on/off state of the electronic device 100 or a source of content displayed on a display of the electronic device 100, or information related to a screen or a sound played on the display of the electronic device 100. For example, the state information of the electronic device 100 may include information indicating that the electronic device 100 is in a power-off state, information indicating that a source of the electronic device 100 is live broadcasting, information indicating that the source of the electronic device 100 is an external input, information indicating that the source of the electronic device 100 is an application, information about a channel of the electronic device 100, or information about a volume of the electronic device 100. Also, the state information of the electronic device 100 may include information about a screen mode or information about a sound mode. According to an embodiment, the information about a screen mode may include information related to image quality adjustment, screen size, screen brightness, screen sharpness or tone density based on viewing environments. Also, according to an embodiment, the information about a sound mode may include information related to sound adjustment, sound equilibrium, or a sound equalizer based on listening environments.

The electronic device 100 and the external electronic device 110 may communicate via a WiFi network. Also, the electronic device 100 and the external electronic device 110 may use P2P communication, such as WiFi direct, Bluetooth, or ZigBee. Hereinafter, embodiments will be described based on the example of communication between the electronic device 100 and the external electronic device 110 in a WiFi direct network environment. However, the embodiments of the present disclosure are not limited thereto, and may include other types of P2P communication between the electronic device 100 and the external electronic device 110, such as Bluetooth, ZigBee, or the like.

WiFi direct devices supporting WiFi direct may perform P2P communication without using an infra network. In detail, in the case of previous WiFi technologies, a WiFi device has to be wirelessly connected to an AP, that is, a sharer connected to an infra network that is already established, in order to form a wireless network. However, in the case of WiFi direct technology, any one of the WiFi direct devices that are to form the wireless network may perform a function of the AP, and the remaining WiFi direct devices may be wirelessly connected to the WiFi direct device performing the function of the AP. Thus, the WiFi direct devices may form a wireless network without an AP connected to an infra network. The WiFi direct devices may include the electronic device 100 and the external electronic device 110.

According to an embodiment, the electronic device 100 may transmit the state information of the electronic device 100 to the external electronic device 110 connected to the AP 120, in the WiFi direct network environment.

Also, the electronic device 100 according to an embodiment may receive, from the external electronic device 110, a user input corresponding to the state information of the electronic device 100, which is transmitted to the external electronic device 110.

According to the embodiment, the electronic device 100 may receive, from the external electronic device 110, the user input corresponding to the state information of the electronic device 100, which is transmitted to the external electronic device 110, in the WiFi direct network environment.

Also, the electronic device 100 according to an embodiment may display a result corresponding to the received user input on a display thereof, and transmit the result displayed on the display thereof to the external electronic device 110. The result displayed on the display of the electronic device 100 may denote state information which is being displayed on the display of the electronic device 100, wherein the state information reflects the user input received from the external electronic device 110. For example, the state information displayed on the display of the electronic device 100 may include information indicating that the electronic device 100 is in a power-off state, information indicating that a source of the electronic device 100 is live broadcasting, information indicating that the source of the electronic device 100 is an external input, information indicating that the source of the electronic device 100 is an application, information related to a channel of the electronic device 100, information related to a volume of the electronic device 100, or the like. Also, the state information displayed on the display of the electronic device 100 may include information about a screen mode or information about a sound mode. The information about a screen mode according to an embodiment may include information related to image quality adjustment, screen size, screen brightness, screen sharpness or tone density based on viewing environments. Also, the information about a sound mode according to an embodiment may include information related to sound adjustment, sound equilibrium, or a sound equalizer based on listening environments.

According to an embodiment, the electronic device 100 may display the result corresponding to the received user input on the display thereof and transmit the result displayed on the display to the external electronic device 110, in the WiFi direct network environment.

The external electronic device 110 according to an embodiment may be connected to the AP to which the electronic device 100 is connected. Also, the external electronic device 110 may receive the state information of the electronic device 100, from the electronic device 100, based on the connection to the AP. Also, the external electronic device 110 may display a user interface corresponding to the received state information of the electronic device 100, on a display thereof. Here, the user interface displayed on the external electronic device 110 may be based on a program, such as an application, etc., which is pre-installed in the external electronic device 110. However, the user interface is not limited thereto. The external electronic device 110 may directly receive an application or a program from the electronic device 100 or may receive an application or a program from an external server, etc., according to the state information received from the electronic device 100. The external electronic device 110 may receive the user input via the user interface. The external electronic device 110 may transmit the received user input to the electronic device 100. Also, the external electronic device 110 may determine whether a program, such as an application for operating the displayed user interface, may be upgraded or not. When the program may be upgraded, the external electronic device 110 may automatically upgrade the program, or may request a selection of a user, by displaying an alert window indicating the upgrade.

The user interface displayed on the display of the external electronic device 110 may denote an interface that is displayed on the display of the external electronic device 110, wherein via the interface, a user input is performed in correspondence to each piece of the received state information of the electronic device 100. For example, when the electronic device 100 is in a power-off state, the user interface displayed on the display of the external electronic device 110 may be a user interface for turning on the electronic device 100 or a user interface related to a source, but is not limited thereto. Also, when, for example, the source of the electronic device 100 is live broadcasting, the user interface displayed on the display of the external electronic device 110 may be a user interface related to channel change, volume adjustment, or electronic program guide (EPG) identification, but is not limited thereto.

According to an embodiment, the external electronic device 110 may receive the state information of the electronic device 100 from the electronic device 100 in the WiFi direct network environment, when the external electronic device 110 is connected to the AP. Also, the external electronic device 110 may transmit the received user input to the electronic device 100 in the WiFi direct network environment.

Figure 2:
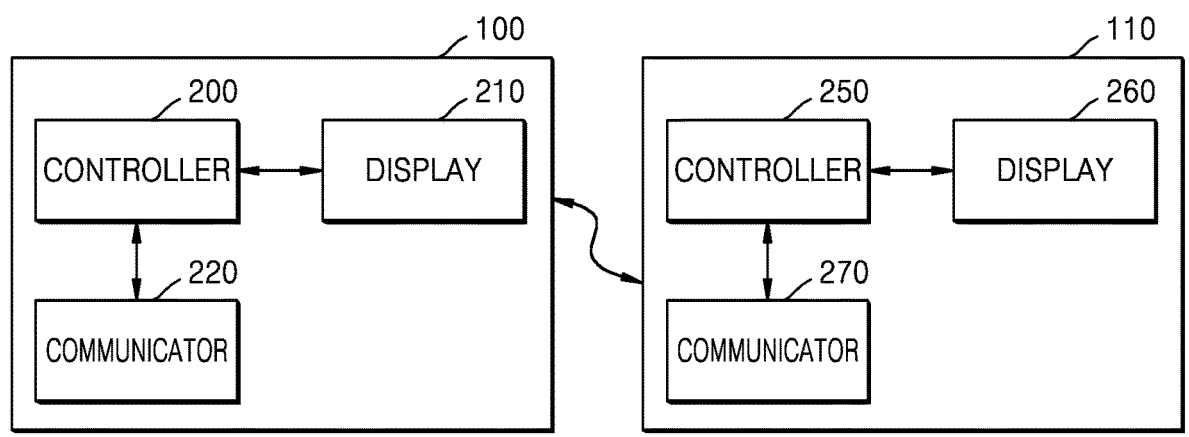
FIG. 2 is a block diagrams illustrating an example structure of an electronic device and an external electronic device, according to an example embodiment of the present disclosure.

FIG. 2 is a block diagram illustrating an example structure of the electronic device 100 and the external electronic device 110, according to an example embodiment of the present disclosure.

Referring to FIG. 2, the electronic device 100 according to an embodiment may include a controller (e.g., including processing circuitry) 200, a display 210, and a communicator (e.g., including communication circuitry) 220.

The controller 200 may include various processing circuitry and process an image signal and input the processed image signal to the display 210. Accordingly, an image corresponding to the image signal may be displayed on the display 210. Also, the controller 200 may control the electronic device 100 via a user input received via the communicator 220, a user input sensed via a sensor, or an internal program.

The display 210 may convert an image signal, a data signal, an OSD signal, a control signal, etc., processed by the controller 200 to generate a driving signal. The display 210 may be realized as a PDP, an LCD, an OLED display, or a flexible display, or the like, but is not limited thereto. Also, the display 210 may be realized as a three-dimensional (3D) display. Also, the display 210 may be formed as a touch screen and may be used as an input device as well as an output device.

According to an embodiment, the communicator 220 may include various communication circuitry and determine whether the external electronic device 110 is connected to the AP 120 to which the electronic device 100 is connected, and may transmit state information of the electronic device 100 to the external electronic device 110 which is connected to the AP 120. The communicator 220 may scan external electronic devices connected to the AP 120 to which the electronic device 100 is connected, and may transmit the state information of the electronic device 100 to the registered external electronic device 110 from among the scanned external electronic devices. Also, the communicator 220 may identify the registered external electronic device 110 by scanning MAC addresses of the external electronic devices connected to the AP 120 by using an ARP, and comparing the scanned MAC addresses of the external electronic devices with the pre-registered MAC address. The connection of the external electronic device 110 may be determined even when the electronic device 100 is in a power-off state, since power is supplied to the communicator 220, etc., which performs the corresponding function. Thus, a user may identify and control the state of the electronic device 100 only by registering the external electronic device 110 in the AP 120, without restrictions according to an on/off condition of the electronic device 100.

According to an embodiment, the display 210 may display information reflecting a user input received from the external electronic device 110, in correspondence to the state information of the electronic device 100.

According to an embodiment, the controller 200 may control the display 210 and the communicator 220.

Referring to FIG. 2, the external electronic device 110 according to an embodiment may include a controller (e.g., including processing circuitry) 250, a display 260, and a communicator (e.g., including communication circuitry) 270.

The controller 250 may include various processing circuitry and control generation operations related to controlling of the external electronic device 110. The controller 250 may transmit a signal corresponding to manipulation of certain keys of an input unit, or a signal corresponding to an input received via the communicator 270 or corresponding to motion of the external electronic device 110, which is sensed by a sensor, to the electronic device 100, via the communicator 270.

The display 260 may convert an image signal, a data signal, an OSD signal, a control signal, etc., processed by the controller 250 to generate a driving signal. The display 260 may be realized as a plasma display panel (PDP), a liquid crystal display (LCD), an organic light-emitting device (OLED) display, or a flexible display, or the like, but is not limited thereto. Also, the display 260 may be realized as a 3D display. Also, the display 260 may be formed as a touch screen and may be used as an input device as well as an output device.

The communicator 270 may include various communication circuitry and transmit and receive a signal to and from any one of the electronic devices 100 according to the embodiments described above. The communicator 270 may include communication circuitry, such as, for example, and without limitation, a radio frequency (RF) module which may transmit and receive a signal to and from the electronic device 100 according to the RF communication standards. Also, the external electronic device 110 may include communication circuitry, such as, for example, and without limitation, an information retrieval (IR) module which may transmit and receive a signal to and from the electronic device 100 according to the IR communication standards.

According to an embodiment, the controller 250 may be connected to an AP to which the electronic device 100 is connected, may receive state information of the electronic device 100 from the electronic device 100 based on the connection, and may control the display 260 to display a user interface corresponding to the received state information of the electronic device 100. Also, the controller 250 may control the communicator 270 to receive a user input via the user interface and transmit the received user input to the electronic device 100.

Figure 3:
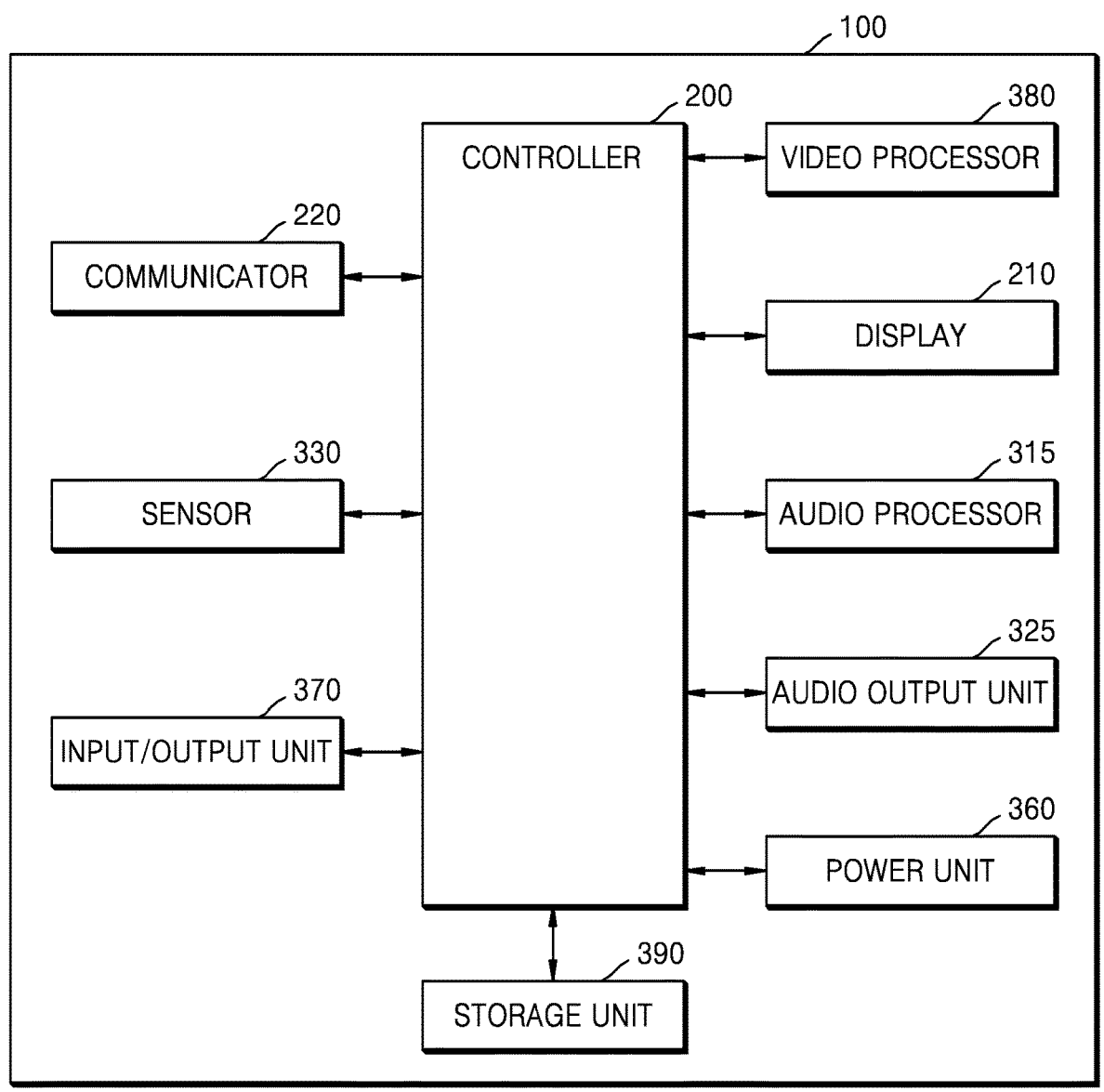
FIG. 3 is a block diagram illustrating an example structure of an electronic device, according to another example embodiment of the present disclosure.

FIG. 3 is a block diagram illustrating an example structure of the electronic device 100, according to another example embodiment of the present disclosure.

Referring to FIG. 3, the electronic device 100 according to an example embodiment may further include an audio processor (e.g., including audio processing circuitry) 315, an audio output unit (e.g., including audio output circuitry) 325, a sensor 330, an input/output unit (e.g., including input/output circuitry) 370, a video processor (e.g., including video processing circuitry) 380, a storage unit 390, and a power unit (e.g., a power supply) 360, in addition to the controller 200, the display 210, and the communicator 220.

The audio processor 315 may include various audio processing circuitry that process audio data.

The audio output unit 325 may include various audio output circuitry to output audio included in a broadcasting signal received under control of the controller 200.

The sensor 330 may sense a voice of a user, an image of the user, or interaction of the user.

The input/output unit 370 may include various input/output circuitry to receive a video (for example, a moving picture, etc.), an audio (for example, a voice, music, etc.), and additional information (for example, EPG, etc.) from the outside of the electronic device 100, under control of the controller 200.

The video processor 380 may include various video processing circuitry to process the video data received by the electronic device 100. The video processor 380 may perform various types of image processing, such as decoding, scaling, noise filtering, frame rate conversion, resolution conversion, etc., on the video data.

The storage unit 390 may store various data, programs, or applications to drive and control the electronic device 100 under control of the controller 200.

The controller 200 may include various processing circuitry to control general operations of the electronic device 100 and signal flow among internal components of the electronic device 100 and may process data. When there is a user input, or a condition which is pre-set and stored is satisfied, the controller 200 may execute an operation system (OS) and various applications stored in the storage unit 390.

According to an embodiment, the controller 200 may control the display 210 and the communicator 220.

The display 210 may display, on a screen, a video included in a broadcasting signal received under control of the controller 200. Also, the display 210 may display content (for example, a video) that is input via the communicator 220 or the input/output unit 370.

According to an embodiment, the display 210 may display a result corresponding to a received user input.

The communicator 220 may include various communication circuitry to connect the electronic device 100 with an external device (for example, a peripheral device, etc.) under control of the controller 200.

According to an embodiment, the communicator 220 may determine whether the external electronic device 110 is connected to the AP 120, to which the electronic device 100 is connected, and may transmit the state information of the electronic device 100 to the external electronic device 110 which is connected to the AP 120. Also, the communicator 220 may scan external electronic devices connected to the AP 120, to which the electronic device 100 is connected, and may transmit the state information of the electronic device 100 to the external electronic device from among the scanned external electronic devices, which is registered in the storage unit 390.

The power unit 360 may include a power supply to supply power to each component of the electronic device 100 when the electronic device 100 is turned on and is in a normal mode state, so that the component of the electronic device 100 may operate. Also, the power unit 360 may supply power to only some components of the electronic device 100 and may not supply power to other components, when the electronic device 100 is turned off and is in a standby mode.

According to an embodiment, the power unit 360 may continually supply power to the communicator 220 when the electronic device 100 is in the standby mode, so that the communicator 220 may continually operate when the electronic device 100 is in a power-off state. Thus, the communicator 220 may sense the connection of the external electronic device even when the electronic device 100 is in an off mode, and may transmit the state information of the electronic device 100 to the sensed external electronic device.

FIG. 4 is a flowchart illustrating example operations among the electronic device 100, the external electronic device 110, and the AP 120, according to an example embodiment of the present disclosure.

In operation S400, information about the external electronic device 110 may be registered in the electronic device 100.

For example, a user may register a desired external electronic device 110 to the electronic device 100. Information for registration may include, but is not limited to, a MAC address of the external electronic device 110, a name of the external electronic device 110, a name of a user of the external electronic device 110, and connection information between the external electronic device 110 and the AP 120.

Via this registration process, the electronic device 100 may determine whether the external electronic device 110 is connected to the AP 120, to which the electronic device 100 is connected, and may transmit the state information of the electronic device 100 to the external electronic device 110 connected to the AP 120.

Registering the information of the external electronic device 110 in the electronic device 100 may be performed to transmit the state information of the electronic device 100 only to the registered external electronic device 110. The registration of the information of the external electronic device 110 is optionally performed, and may not be necessarily required for the operations illustrated in FIG. 4.

If the external electronic device 110 is not required to be registered in the electronic device 100, the electronic device 100 may transmit the state information of the electronic device 100 to all external electronic devices 110 connected to the AP 120 to which the electronic device 100 is connected. Thus, when, for example, a friend of a user of the electronic device 100, which is connected to the AP 120, encounters the user, and an external electronic device of the friend of the user is connected to the same AP 120 to which the electronic device 100 is connected, the electronic device 100 may also transmit the state information of the electronic device 100 to the external electronic device 110 of the friend of the user. This operation may cause a problem in that the electronic device 100 may be manipulated by the external electronic device 110, which is not intended by the user manipulating the electronic device 100. Thus, it may be desirable that the external electronic device 110 be pre-registered in the electronic device 100 so that the state information of the electronic device 100 is transmitted to only the pre-registered external electronic device 110.

However, according to another embodiment, when there is a need that all external electronic devices 110 connected to the AP 120 manipulate the electronic device 100, regardless of whether or not the external electronic devices 110 are registered in the electronic device 100, the electronic device 100 may transmit the state information of the electronic device 100 to all the external electronic devices 110 connected to the AP 120.

Alternatively, according to another embodiment, the external electronic device 110 may receive the state information of the electronic device 100 via an additional authentication process without the registration in the electronic device 100, and may determine whether to display the state information of the electronic device 100.

That is, the external electronic device 110 may be automatically connected to the AP 120, when the external electronic device 110 is within a certain distance in which the external electronic device 110 may communicate with the AP 120. In this case, the electronic device 100 may transmit information about the connection of the electronic device 100 to the AP 120, to the external electronic device 110 connected to the AP 120. The information about the connection of the electronic device 100 to the AP 120, according to an embodiment, may include information for the authentication of the external electronic device 110.

For example, the electronic device 100 may transmit a key value for the authentication of the external electronic device 110 to the external electronic device 110, and the external electronic device 110 may compare the received key value for the authentication with an authentication value that is input by a user, and when the received key value for the authentication and the authentication value that is input by the user are the same, may determine that the external electronic device 110 is authenticated. When it is determined that the external electronic device 110 is authenticated, the external electronic device 110 may perform an operation using the state information of the electronic device 100.

Also, for example, when the external electronic device 110 receives information for the authentication of the external electronic device 110, the external electronic device 110 may request a user to select whether to control the electronic device 100 via the external electronic device 110.

In operation S410, the electronic device 100 may be connected to the AP 120. The electronic device 100 may be connected to the AP 120 in a WiFi network environment. The electronic device 100 may store connection information with respect to the AP 120 in the electronic device 100. The connection information with respect to the AP 120 may include various pieces of information that are necessary for connection with the AP 120 in the WiFi network environment. For example, the connection information may include subsystem identification (SSID) of the AP 120 or a password for connection with the AP 120, but is not limited thereto.

In operation S420, the external electronic device 110 may be connected to the AP 120 to which the electronic device 100 is connected, in operation S420.

The external electronic device 110 may be connected to the AP 120 to which the electronic device 100 is connected in the WiFi network environment. The external electronic device 110 may store connection information with respect to the AP 120 in the external electronic device 110. The connection information with respect to the AP 120 may include various pieces of information that are necessary for the connection to the AP 120 in the WiFi network environment. Also, without storing the connection information with respect to the AP 120 or without an additional user input, the external electronic device 110 may be automatically connected to the AP 120 when the external electronic device 110 is within a distance in which the external electronic device 110 may communicate with the AP 120.

In operation S430, the electronic device 100 may determine whether the external electronic device 110 is connected to the AP 120 to which the electronic device 100 is connected.

The determining whether the external electronic device 110 is connected to the AP 120 to which the electronic device 100 is connected may denote scanning all the external electronic devices 110 connected to the AP 120 to which the electronic device 100 is connected. According to an embodiment, the electronic device 100 may identify the registered external electronic device 110 by comparing information, such as MAC addresses of the external electronic devices connected to the AP 120, user information of the external electronic devices, or names of the external electronic devices, with pre-registered information, by using an ARP. The determining whether the external electronic device 110 is connected to the AP 120 to which the electronic device 100 is connected may be performed regardless of a power state of the electronic device 100.

In operation S440, the electronic device 100 may transmit the state information of the electronic device 100 to the external electronic device 110 which is connected to the AP 120.

To transmit the state information of the electronic device 100 to the external electronic device 110 connected to the access point 120, via the electronic device 100, may denote to transmit the state information of the electronic device 100 to the registered external electronic device 110 from among the scanned external electronic devices In operation S450, the external electronic device 110 may display a user interface on a display thereof, based on the received state information of the electronic device 100.

The user interface displayed on the display of the external electronic device 110 may be based on a program, such as an OS or an application, which is pre-installed in the external electronic device 110. However, the user interface is not limited thereto. The external electronic device 110 may directly receive an application or a program from the electronic device 100 or may receive an application or a program from an external server, etc., according to the state information received from the electronic device 100.

According to another embodiment, before operation S450, the external electronic device 110 may display, on the display, an alert window indicating that the state information of the electronic device 100 is received, and may request a user to select whether to display the user interface that is necessary for controlling of the electronic device 100.

The electronic device 100 may provide information related to the user interface for the external electronic device 110 to identify the electronic device 100. For example, the information related to the user interface may include a program, such as an OS or an application, which is to be installed in the external electronic device 110 for the user interface, but is not limited thereto.

Figure 5A:
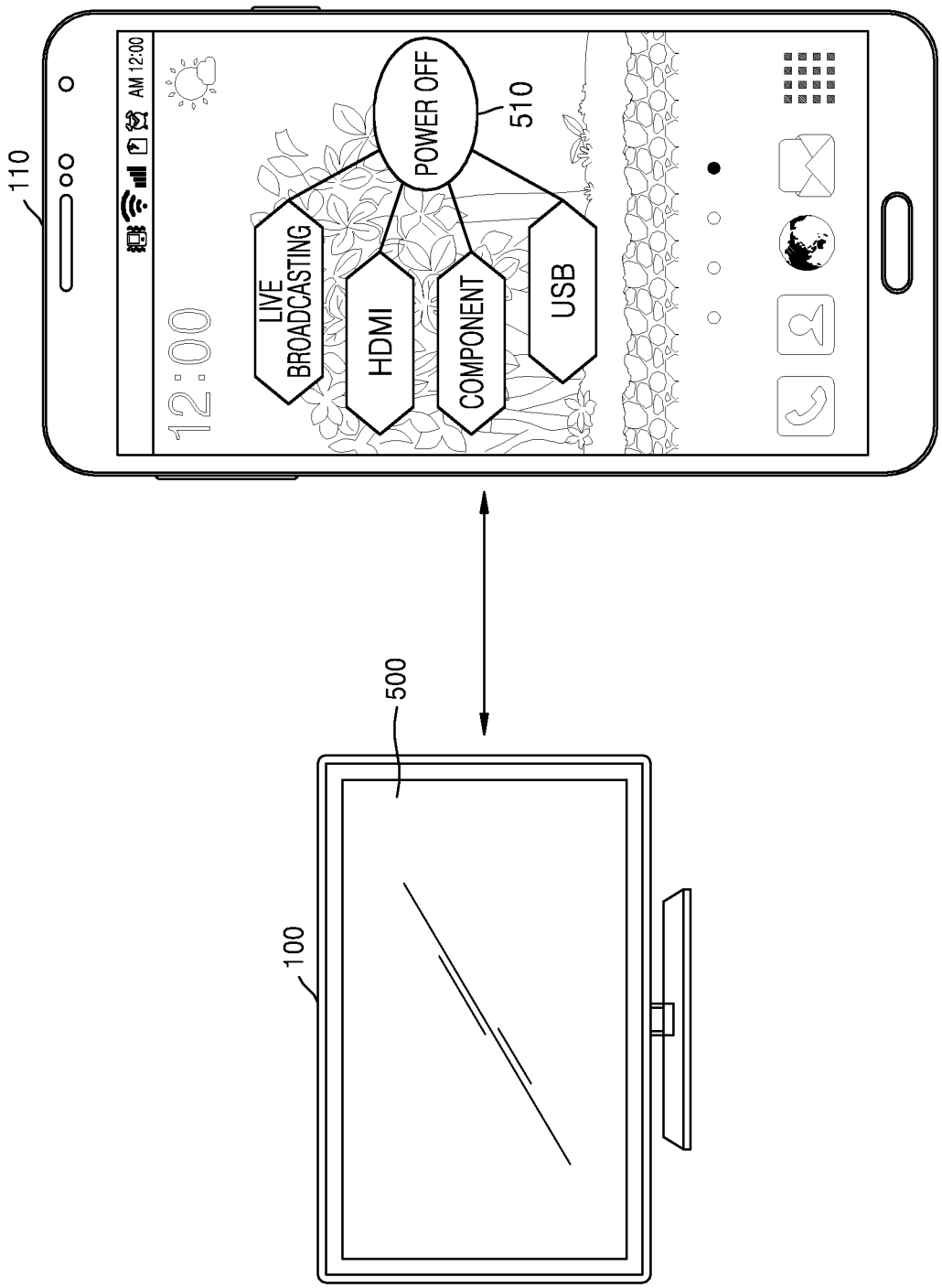
FIGS. 5A and 5B are diagrams illustrating example operations of an electronic device and an external electronic device which share a WiFi network, according to an example embodiment of the present disclosure.
Figure 5B:
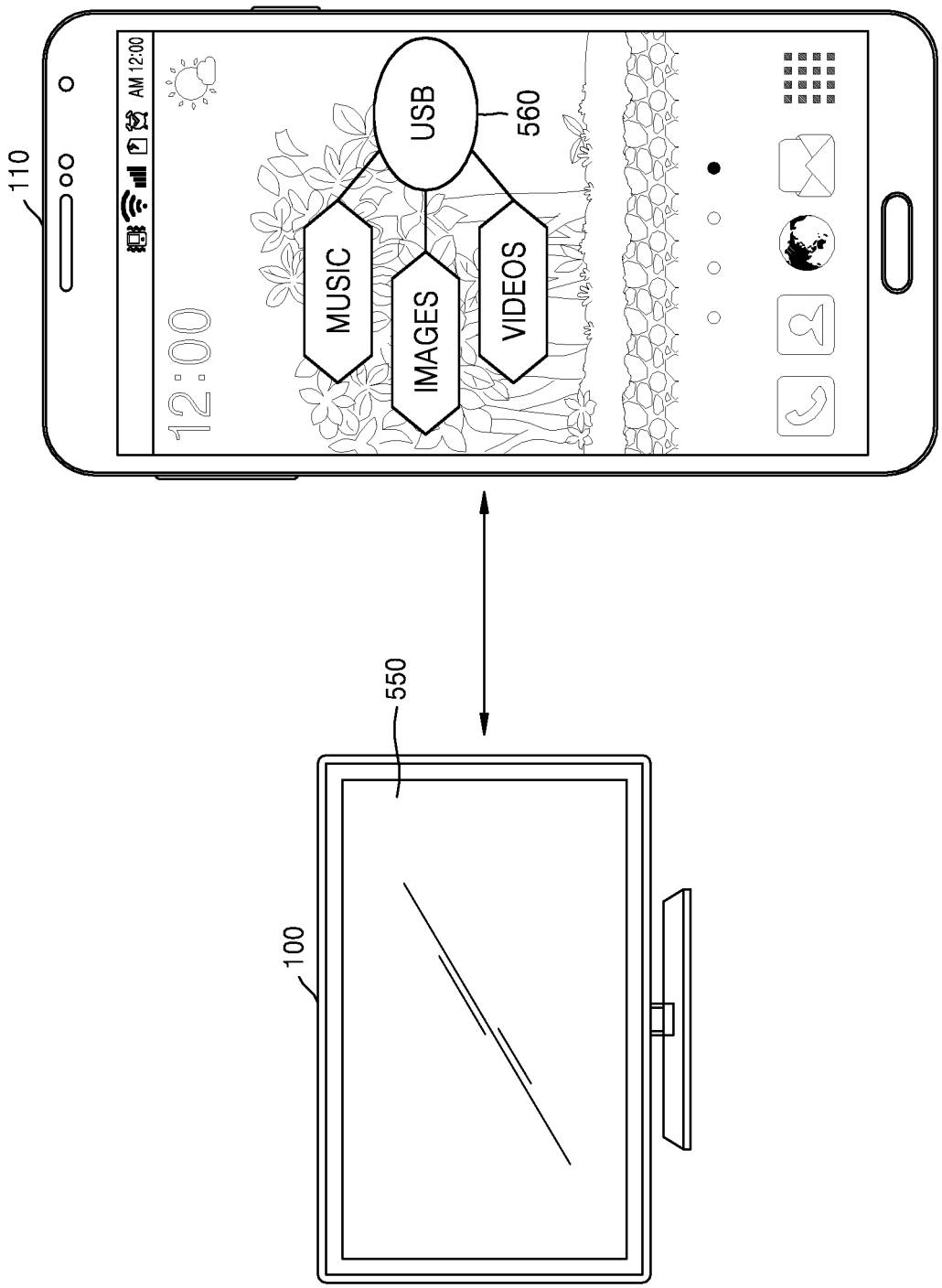

FIGS. 5A and 5B are diagrams illustrating example operations of the electronic device 100 and the external electronic device 110 which share a WiFi network, according to an example embodiment of the present disclosure.

The electronic device 100 may register the external electronic device 110, and the information for the registration may include a MAC address of the external electronic device 110, a name of the external electronic device 110, a name of a user, connection information with respect to the AP 120, etc., but is not limited thereto. Via this registration process, it may be determined whether the external electronic device 110 is connected to the AP 120 to which the electronic device 100 is connected so that the state information of the electronic device 100 is transmitted to the external electronic device 110 connected to the AP 120.

According to an embodiment, the electronic device 100 may transmit the state information of the electronic device 100 to the external electronic device 110. Also, the external electronic device 110 may display, on a display thereof, a user interface via which the electronic device 100 is controlled, according to the received state information of the electronic device 100.

The user interface displayed on the display of the external electronic device 110 may denote an interface that is displayed on the display of the external electronic device 110, wherein via the interface, a user input is performed in correspondence to each piece of the received state information of the electronic device 100. For example, when the electronic device 100 is in a power-off state, the user interface displayed on the display of the external electronic device 110 may be a user interface for turning on the electronic device 100 or a user interface related to a source, but is not limited thereto. Also, when, for example, the source of the electronic device 100 is live broadcasting, the user interface displayed on the display of the external electronic device 110 may be a user interface related to channel change, volume adjustment, or electronic program guide (EPG) identification, but is not limited thereto.

FIG. 5A is a diagram illustrating example operations of the electronic device 100 and the external electronic device 110 when the electronic device 100 is in a power-off state 500, according to an embodiment. Referring to FIG. 5A, the electronic device 100 may transmit information about the power-off state 500 of the electronic device 100 to the external electronic device 110 connected to the AP 120. Also, the external electronic device 110 may display, on the display thereof, a user interface 510 including the received information about the power-off state 500 of the electronic device 100. For example, when the electronic device 100 is in the power-off state 500, the user interface 510 displayed on the display of the external electronic device 110 may be a user interface related to the source of the electronic device 100, but is not limited thereto. In detail, the external electronic device 110 may display, on the display, the current state ("power off") of the electronic device 100 and a menu to select the source ("live broadcasting," "high definition multimedia interface (HDMI)," "component," or "universal serial bus (USB)") which is to be used when the electronic device 100 is turned on.

FIG. 5B is a diagram illustrating example operations of the electronic device 100 and the external electronic device 110 when the source of the electronic device 100 is a USB, according to an embodiment. Referring to FIG. 5B, the electronic device 100 may transmit information 550 indicating that the source of the electronic device 100 is the USB to the external electronic device 110 connected to the AP 120. Also, the external electronic device 110 may display, on the display thereof, a user interface 560 including the received information 550 indicating that the source of the electronic device 100 is the USB. For example, in the case of the information 550 indicating that the source of the electronic device 100 is the USB, the user interface 560 displayed on the display of the external electronic device 110 may be a user interface related to music, images, videos, etc., but is not limited thereto. In detail, the external electronic device 110 may display, on the display, the current state ("USB") of the electronic device 100 and a menu ("music," "images," or "videos") which is to be used when the source of the electronic device 100 is the USB.

Figure 6:
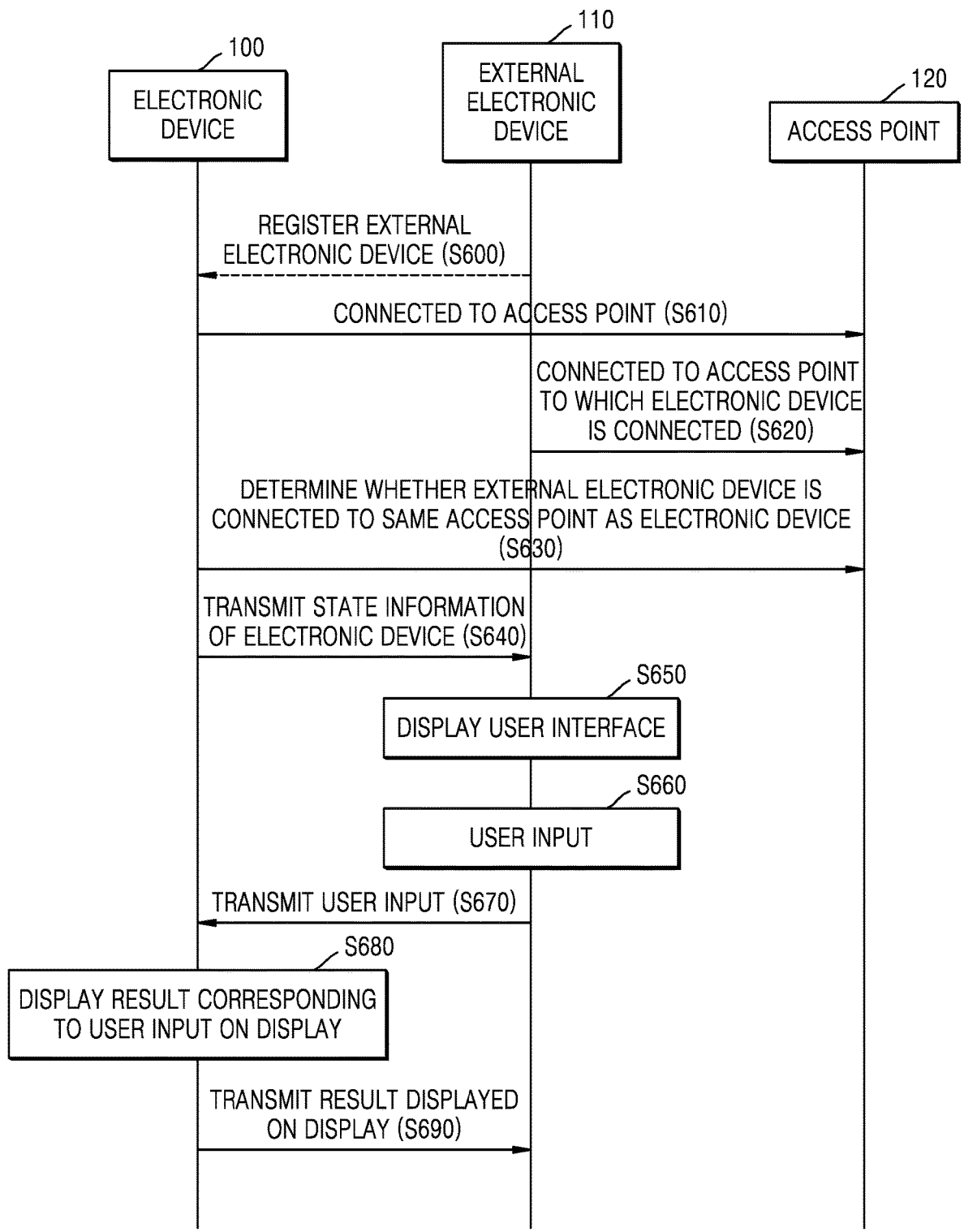
FIG. 6 is a flowchart illustrating example operations among an electronic device, an external electronic device, and an access point, according to another example embodiment of the present disclosure.

FIG. 6 is a flowchart illustrating example operations among the electronic device 100, the external electronic device 110, and the AP 120, according to another example embodiment of the present disclosure.

The electronic device 100 may register the external electronic device 110 in operation S600. In operation S610, the electronic device 100 may be connected to the AP 120. In operation S620, the external electronic device 110 may be connected to the AP 120 to which the electronic device 100 is connected. In operation S630, the electronic device 100 may determine whether the external electronic device 110 is connected to the AP 120 to which the electronic device 100 is connected. In operation S640, the electronic device 100 may transmit the state information of the electronic device 100 to the external electronic device 110 connected to the AP 120. In operation S650, the external electronic device 110 may display, on a display thereof, a user interface including the received state information of the electronic device 100.

Operations S600 through S650 correspond to operation S400 through S450 of FIG. 4, respectively. Since operations S400 through S450 are described in detail, operations S600 through S650 will not be further described here.

The external electronic device 110 may receive an input (e.g., a user input) via the user interface in operation S660.

The external electronic device 110 may transmit the received user input to the electronic device 100 in operation S670.

The electronic device 100 may display, on a display thereof, a result corresponding to the received user input, in operation S680.

The electronic device 100 may transmit the result displayed on the display to the external electronic device 110 in operation S690.

In addition, according to another embodiment, before operation S650, the external electronic device 110 may display, on the display thereof, an alert window indicating that the state information of the electronic device 100 is received, and may request a user to select whether to display the user interface that is necessary for controlling of the electronic device 100.

Figure 7A:
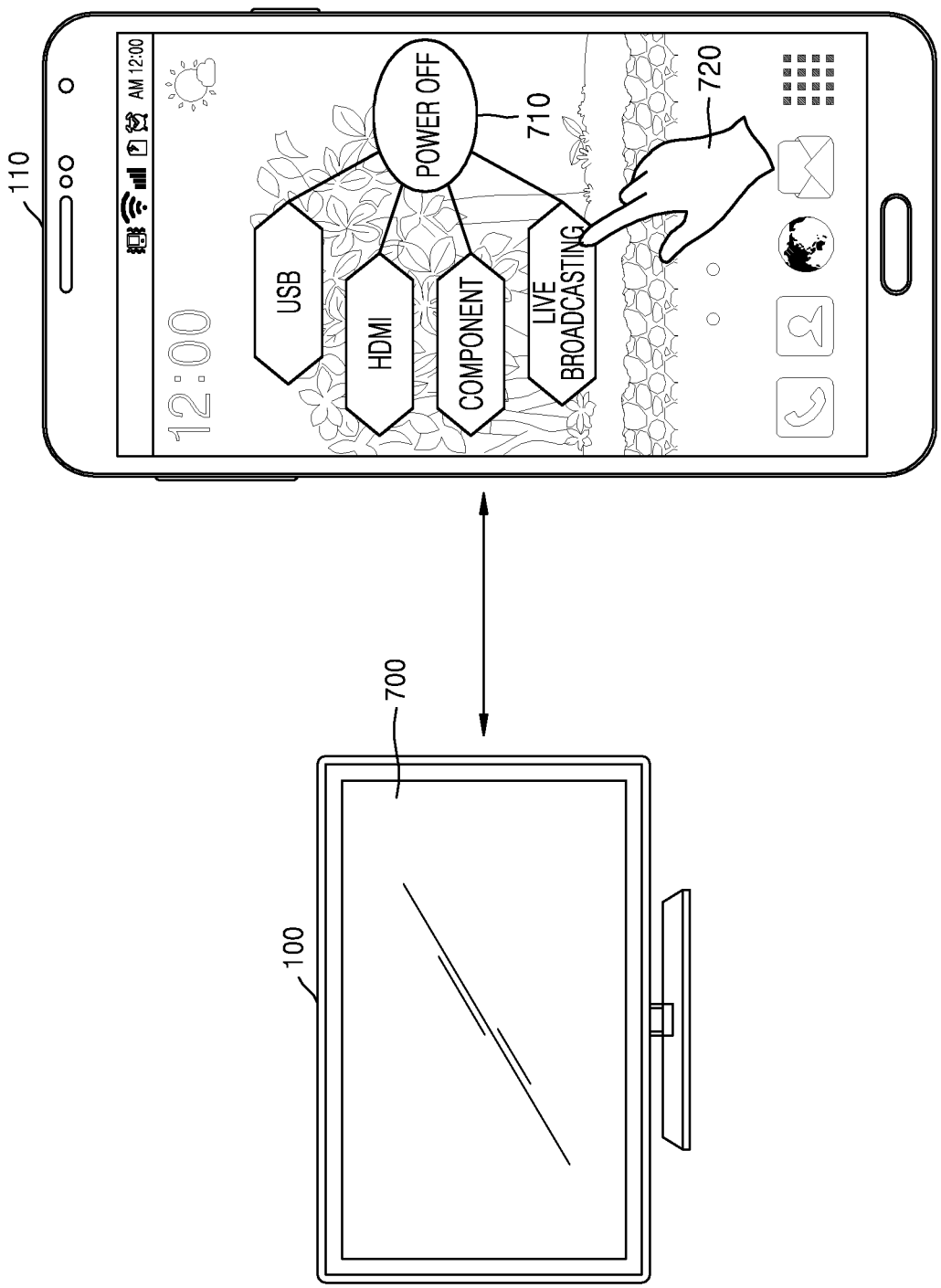
FIGS. 7A and 7B are diagrams illustrating example operations of an electronic device and an external electronic device which share a WiFi network, according to another example embodiment of the present disclosure.
Figure 7B:
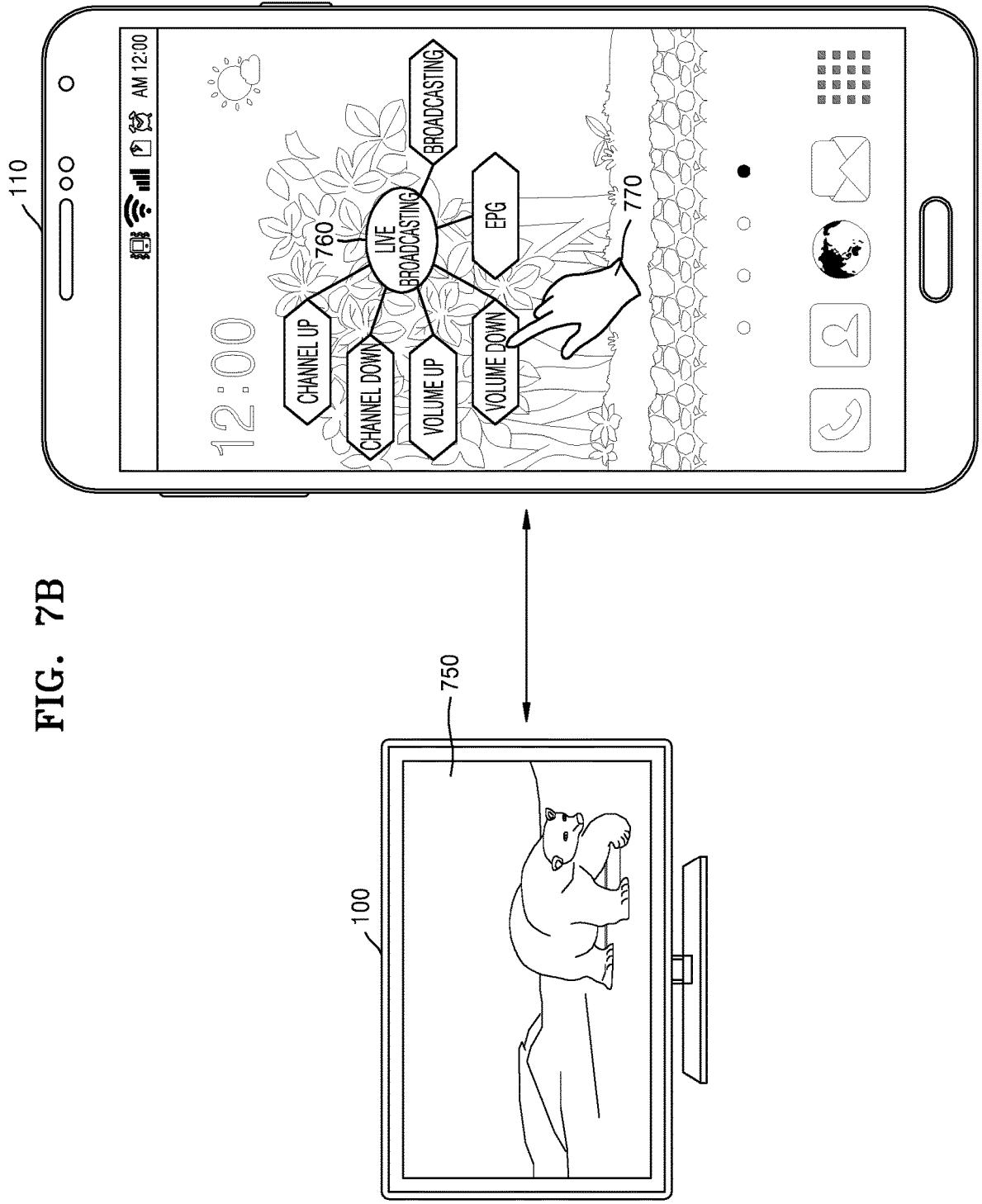

FIGS. 7A and 7B are diagrams illustrating example operations of the electronic device 100 and the external electronic device 110 which share a WiFi network, according to another example embodiment of the present disclosure.

According to an embodiment, the external electronic device 110 may receive a user input via a user interface. Also, the external electronic device 110 may transmit the received user input to the electronic device 100. The electronic device 100 may display, on a display thereof, a result corresponding to the received user input. Also, the electronic device 100 may transmit the result displayed on the display to the external electronic device 110. The external electronic device 110 may display, on a display thereof, the user interface including the received result displayed on the display of the electronic device 100.

FIG. 7A is a diagram illustrating example operations of the electronic device 100 and the external electronic device 110 when the electronic device 100 is in a power-off state 700, according to an embodiment. The power-off state 700 and a user interface 710 displayed on the display of the external electronic device 110 of FIG. 7A may correspond to the power-off state 500 and the user interface 510 displayed on the display of the external electronic device 110 of FIG. 5A. Since the power-off state 500 and the user interface 510 are described in detail, the power-off state 700 and the user interface 710 will not be further described here.

Referring to FIG. 7A, the external electronic device 110 may receive a user input 720 that selects "live broadcasting," via the user interface 710. Also, the external electronic device 110 may transmit the received user input 720 to the electronic device 100. Here, since the electronic device 100 is in the power-off state 700, the external electronic device 110 may transmit a control signal corresponding to a power-on state of the electronic device 100 and a control signal instructing that the source of the external electronic device 110 is live broadcasting, to the electronic device 100.

FIG. 7B is a diagram illustrating example operations of the electronic device 100 and the external electronic device 1110 when the electronic device 100 receives the user input 720 from the external electronic device 110, according to an embodiment. Referring to FIGS. 7A and 7B, the electronic device 100 may receive the user input 720 from the external electronic device 110 and may display on a display thereof, a result 750 corresponding to the received user input 720. In detail, the electronic device 100 may receive the user input 720 selecting "live broadcasting" from the external electronic device 110, and may display on the display the result 750 corresponding to the received user input 720 selecting "live broadcasting," that is, the source, "live broadcasting."

Also, the electronic device 100 may transmit the result 750 displayed on the display to the external electronic device 110, and the external electronic device 110 may display, on the display thereof, the user interface 760 including the received result 750 displayed on the display of the electronic device 100. In detail, the external electronic device 110 may display the current state ("live broadcasting") 760 of the electronic device 100 and a menu ("channel up," "channel down," "volume up," "volume down," "EPG," or "recording") which is to be used in the electronic device 100 in the live broadcasting state. The electronic device 100 may receive the user input 770 selecting "volume down" from the external device 110 and implement this function in the electronic device 100.

The present disclosure may be embodied as a program executed in a computer, and may be implemented in a general purpose digital computer by using a computer-readable medium. Also, a structure of data used in the method may be recorded by using various units on a computer-readable medium. The present disclosure may be embodied as a recording medium, e.g., a program module to be executed in computers, which include computer-readable commands. For example, any processes may be implemented as software modules or algorithms, and may be stored as program instructions or computer readable codes executable by a processor on a computer-readable media.

While the present disclosure has been illustrated and described with reference to example embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the disclosure. For example, each component described in a single type may be executed in a distributed manner, and components described distributed may also be executed in an integrated form.

The scope of the present disclosure is indicated by the claims rather than by the detailed description, and it should be understood that the claims and all modifications or modified forms drawn from the concept of the claims are included in the scope of the present disclosure.

What is claimed is:

1. An electronic device comprising:
a display;
a communicator comprising communication circuitry; and
at least one processor configured to:
identify whether an external electronic device is connected to an access point to which the electronic device is connected, regardless of a power state of the electronic device,
control the communicator to transmit state information of the electronic device to the external electronic device connected to the access point, the state information comprising at least one of information indicating a source of content displayed on the display of the electronic device or information regarding a screen mode of the electronic device, the source of content comprising at least one of live broadcasting or an external input,
receive, from the external electronic device, an input corresponding to the transmitted state information of the electronic device, the input being an input for controlling the electronic device based on the transmitted state information,
control the display to display a result corresponding to the received input, and
control the communicator to transmit the status information changed by displaying the result corresponding to the received input to the external electronic device.

2. The electronic device of claim 1, further comprising storage configured to store information of the external electronic device,
wherein the at least one processor is further configured to:
control the communicator to scan external electronic devices connected to the access point to which the electronic device is connected, and
transmit the state information of the electronic device to an external electronic device from among the scanned external electronic devices, the external electronic device being pre-registered in the storage.

3. The electronic device of claim 2, wherein the at least one processor is further configured to identify the pre-registered external electronic device by scanning media access control (MAC) addresses of the external electronic devices connected to the access point using an address resolution protocol and comparing the scanned MAC addresses of the external electronic devices with a MAC address registered in the storage.

4. The electronic device of claim 1, wherein the state information of the electronic device comprises at least one of information indicating a power state of the electronic device, or a type of content reproduced in the electronic device.

5. The electronic device of claim 1, wherein the electronic device is configured to be automatically connected to the access point when the electronic device is within a predetermined distance from the access point, in which communication between the electronic device and the access point is possible, and
the at least one processor is further configured to control the communicator to transmit information about the connection of the electronic device to the external electronic device connected to the access point.

6. The electronic device of claim 5, wherein the at least one processor is further configured to control the communicator to transmit information necessary for the external electronic device to display a user interface to identify the electronic device, to the external electronic device.

7. A portable electronic device comprising:
a communicator comprising communication circuitry;
a display; and
at least one processor configured to:
connect the portable electronic device to an access point to which an electronic device is connected,
receive state information of the electronic device from the electronic device, based on the connection, regardless of a power state of the electronic device, the state information comprising at least one of information indicating a source of content displayed on a display of the electronic device or information regarding a screen mode of the electronic device, the source of content comprising at least one of live broadcasting or an external input,
control the display to display a user interface configured to receive an input corresponding to the received state information of the electronic device,
receive an input via the user interface, the input being an input for controlling the electronic device based on the transmitted state information, and
control the communicator to transmit the received input to the electronic device.

8. The portable electronic device of claim 7, wherein the state information of the electronic device comprises at least one of information indicating a power state of the electronic device, or a type of content reproduced in the electronic device.

9. The portable electronic device of claim 7, wherein the portable electronic device is configured to be automatically connected to the access point when the portable electronic device is within a pre-determined distance from the access point, in which communication between the portable electronic device and the access point is possible, and the at least one processor is further configured to receive a program for displaying the user interface, from at least one of the electronic device and a server using information for displaying the user interface, the information being received from the electronic device.

10. A method of operating an electronic device, the method comprising:

identifying whether an external electronic device is connected to an access point to which the electronic device is connected regardless of a power state of the electronic device;

transmitting state information of the electronic device to the external electronic device connected to the access point, the state information comprising at least one of information indicating a source of content displayed on the display of the electronic device or information regarding a screen mode of the electronic device, the source of content comprising at least one of live broadcasting or an external input;

receiving an input corresponding to the transmitted state information of the electronic device, from the external electronic device, the input being an input for controlling the electronic device based on the transmitted state information;

displaying a result corresponding to the received input on a display; and transmitting the status information changed by displaying the result corresponding to the received input to the external electronic device.

11. The method of claim 10, wherein the state information of the electronic device comprises at least one of information indicating a power state of the electronic device, or a type of content reproduced in the electronic device.

12. The method of claim 10, wherein the electronic device is automatically connected to the access point when the electronic device is within a pre-determined distance from the access point, in which communication between the electronic device and the access point is possible, and the method further comprises transmitting information about the connection of the electronic device to the external electronic device connected to the access point.

13. The method of claim 12, further comprising transmitting information to the external electronic device which is necessary for the external electronic device to display a user interface to identify the electronic device.

14. A computer program product comprising a non-transitory computer readable storage medium having a computer readable program stored therein, wherein the computer readable program, when executed on a computing device, causes the computing device to:

identify whether an external electronic device is connected to an access point to which an electronic device is connected, regardless of a power state of the electronic device, control the communicator to transmit state information of the electronic device to the external electronic device connected to the access point, the state information comprising at least one of information indicating a source of content displayed on a display of the electronic device or information regarding a screen mode of the electronic device, the source of content comprising at least one of live broadcasting or an external input, receive, from the external electronic device, an input corresponding to the transmitted state information of the electronic device, the input being an input for controlling the electronic device based on the transmitted state information, display a result corresponding to the received input, and transmit the status information changed by displaying the result corresponding to the received input to the external electronic device.

15. The electronic device of claim 1, wherein the at least one processor is further configured to register information about the external electronic device.

16. The electronic device of claim 1, wherein the electronic device communicates with the external electronic device via at least one of communication via a WiFi network or peer to peer (P2P) communication.

17. The portable electronic device of claim 9, wherein the at least one processor is further configured to determine whether the program for displaying the user interface can be upgraded.

18. The portable electronic device of claim 17, wherein the at least one processor is further configured to at least one of upgrade the program and request for a user input of whether to upgrade the program, when the program can be upgraded.

* * * * *